(12) United States Patent
Zomerdijk et al.

(10) Patent No.: US 12,507,702 B2
(45) Date of Patent: Dec. 30, 2025

(54) EVISCERATING TOOL

(71) Applicant: Meyn Food Processing Technology B.V., Oostzaan (NL)

(72) Inventors: Hermanus Laurentius Zomerdijk, Oostzaan (NL); Derek Raymond Dil, Oostzaan (NL); Evert Kikstra, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 18/949,216

(22) Filed: Nov. 15, 2024

(65) Prior Publication Data
US 2025/0160347 A1 May 22, 2025

(30) Foreign Application Priority Data
Nov. 17, 2023 (NL) .................................... 2036289

(51) Int. Cl.
*A22C 21/00* (2006.01)
*A22C 21/06* (2006.01)

(52) U.S. Cl.
CPC .................................. *A22C 21/06* (2013.01)

(58) Field of Classification Search
CPC ............................... A22C 21/06; A22B 5/005
USPC ........................................................ 452/106
See application file for complete search history.

(56) References Cited

U.S. PATENT DOCUMENTS 3,956,801 A * 5/1976 Wood .................... F16C 35/067
29/725
4,019,222 A * 4/1977 Scheier .................. A22C 21/06
452/117

FOREIGN PATENT DOCUMENTS

| CN | 212 590 026 U | 2/2021 |
| EP | 1 677 611 B1 | 4/2010 |
| KR | 101 418 669 B1 | 8/2014 |
| WO | WO 01/52659 | 7/2001 |
| WO | WO 2016/013931 | 1/2016 |
| WO | WO 2016/032059 | 3/2016 |

OTHER PUBLICATIONS

Netherlands Search Report, May 16, 2024.

* cited by examiner

*Primary Examiner* — Richard T Price, Jr.
(74) *Attorney, Agent, or Firm* — Dority & Manning, P.A.

(57) ABSTRACT

An eviscerating tool include jaw arms provided with jaws at extremities of the jaw arms. At least one jaw arm of the jaw arms is rotatable around an axis of rotation to provide that the eviscerating tool is movable between an open position and a closed position. In the open position the jaws can grip and in the closed position the jaws can hold poultry intestines. At least one jaw arm of the jaw arms is provided with an actuation part for moving the eviscerating tool between the open position and the closed position. A cam plate is drivable for moving at least one jaw arm of the jaw arms can be subjected to a load so as to bias the cam plate into a position in an aperture.

9 Claims, 2 Drawing Sheets

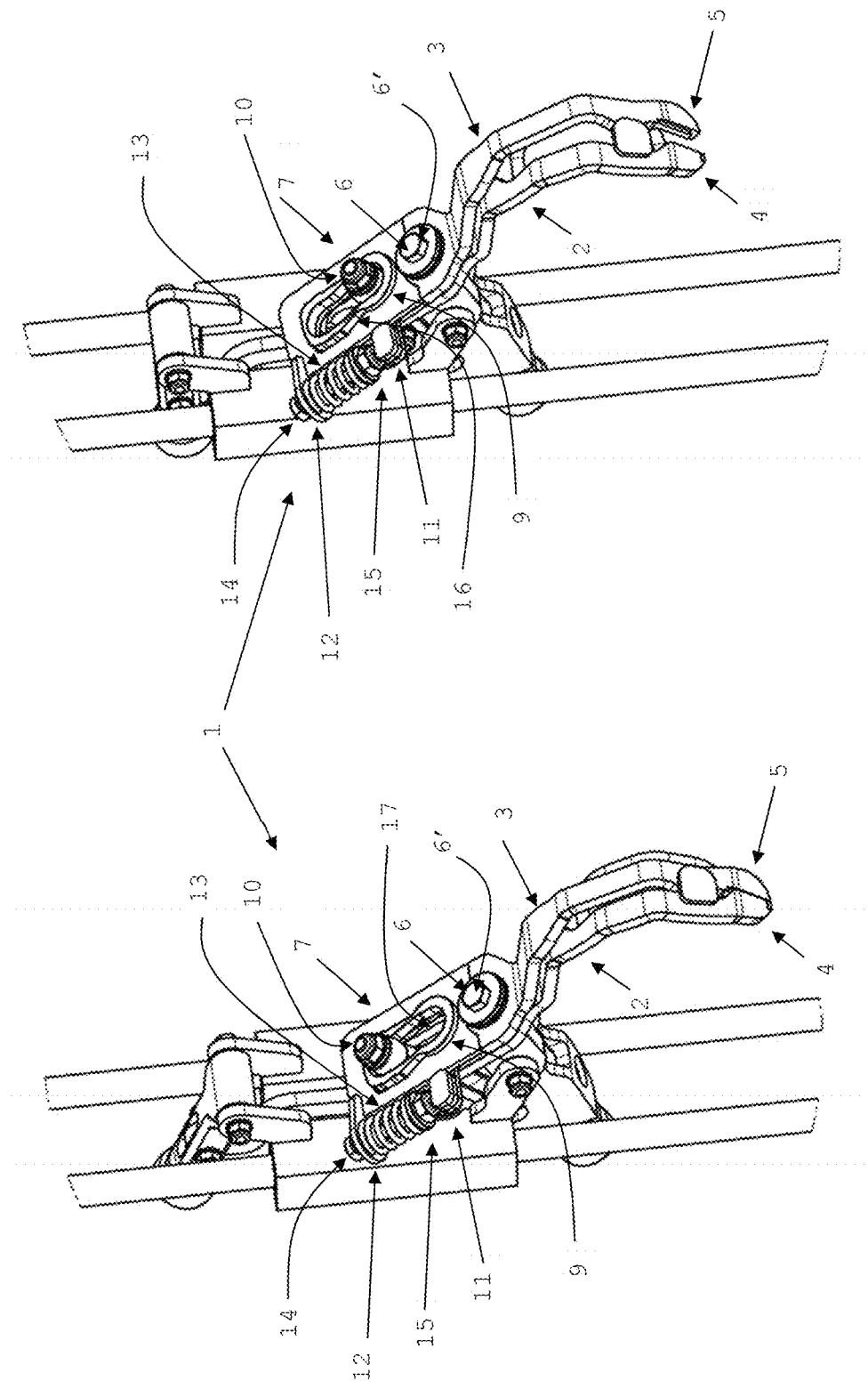

EVISCERATING TOOL

PRIORITY STATEMENT

The present application claims priority under 35 U.S.C § 119 to Dutch Patent Application No. 2036289, filed on Nov. 17, 2023.

FIELD OF THE INVENTION

The subject matter of the present disclosures relates generally to an eviscerating tool.

BACKGROUND OF THE INVENTION

An eviscerating tool is described in WO01/52659 and from WO2016/013931. WO01/52659 claims an eviscerating tool for processing a cluster of viscera of a slaughtered animal, including two jaw parts which are adapted to move with respect to one another between an open position, in which a first jaw part is at a distance from the second jaw part, and a closed position, in which the first jaw part is driven towards the second jaw part; support means for supporting the jaw parts; first actuating means for moving the support means and the jaw parts at least partially into and out of the body cavity of the slaughtered animal; and second actuating means for moving the jaw parts with respect to one another between their open position and their closed position. The first and second actuating means are designed in such a manner that, in succession, the first actuating means, substantially without moving the viscera, move the support means and the jaw parts into the body cavity in order to place part of the cluster of viscera between the jaw parts, the second actuating means having previously moved the jaw parts into the open position. The second actuating means moves the jaw parts into their closed position in order to clamp onto the part of the cluster of viscera. The first actuating means moves the support means in order to move the cluster of viscera.

The applicant remarks that it is possible that both arms are movable, but also that only one of the jaw arms is movable so as to provide that the jaws can move between the open position and the closed position.

WO2016032059 discloses a poultry viscera extraction device including an extraction unit movable upward or downward. Th device has a fixing unit for fixing a body, which has a central axis in the upward and downward direction, an extraction unit, provided on the upper part of a fixing unit so as to move upward or downward, formed so as to be able to selectively be pushed into or pulled out of a body of poultry fixed by means of the fixing unit, the extraction unit being arranged for gripping the gullet of the poultry and thereby extracting the viscera connected to the gullet; and a plurality of extraction assemblies provided side by side along the periphery of the body and rotating along the periphery of the body with respect to the central axis of the body.

SUMMARY OF THE INVENTION

In one exemplary aspect, it is an object of the invention to counter the influence of wear and tear on the accuracy of the eviscerating tool.

In one exemplary embodiment, the invention can relate to an eviscerating tool having jaw arms provided with jaws at extremities of the jaw arms. The at least one jaw arm of the jaw arms is rotatable around an axis of rotation to provide that the eviscerating tool is movable between an open position and a closed position. In the open position the jaws can grip and in the closed position the jaws and can hold poultry intestines. At least one jaw arm of the jaw arms is provided with an actuation part for moving the eviscerating tool between the open position and the closed position.

In another exemplary embodiment, an eviscerating tool can include jaw arms provided with jaws at extremities of the jaw arms, wherein at least one jaw arm of the jaw arms is rotatable around an axis of rotation to provide that the eviscerating tool is movable between an open position and a closed position. In the open position the jaws can grip and in the closed position the jaws can hold poultry intestines. The at least one jaw arm of the jaw arms can be provided with an actuation part for moving the eviscerating tool between the open position and the closed position. The actuation part can include an aperture equipped to receive a cam plate that is drivable for moving the at least one jaw arm of the jaw arms that is provided with the cam plate.

In another exemplary aspect of the invention, the cam plate can fit into the aperture while leaving a play between the cam plate and the aperture enabling a movement of the cam plate with respect to the at least one jaw arm. The cam plate can be subjected to a load so as to bias the cam plate into a preferred position in the aperture. Accordingly, the cam plate that is used to drive the eviscerating tool can always occupies a well-defined position. The play can allow for (a partly) rotational motion of the cam plate relative to the at least one jaw arm. The cam plate can be loaded with a spring. A spring is a reliable and not expensive tool to provide the load to the cam plate.

In another exemplary arrangement, the cam plate can be provided with a first sideways extending arm. The at least one jaw arm of the jaw arms that is provided with the cam plate can be provided with a second sideways extending arm. The first and second sideways extending arms can be loaded with a spring. This provides a reliable and not expensive way of exercising a load to the cam plate.

In another exemplary aspect, the spring can be mounted on a bolt and nut that are provided on the second sideways extending arm.

In another exemplary aspect of the invention, an eviscerating device is provided that includes multiple eviscerating tools according to the invention. The eviscerating device is placeable in a processing line for eviscerating poultry. The processing line can include a carousel device for driving the respective eviscerating tools.

In still another exemplary aspect, the invention can be further embodied in a cam plate as described as part of an eviscerating tool in accordance with the invention. The cam plate can include an inner slit capable to receive a driving pin, and an outer circumference which fits into an aperture provided in an actuating part of a jaw arm of the eviscerating tool. The cam plate can be provided with a first sideways extending arm.

The cam plate can include a single uninterrupted inner slit that is delimited by an outer circumferential wall that on its side facing the inner slit directly delimits the inner single slit. On its side facing away from the inner slit, the circumferential wall is shaped different than according to a circular shape. The cam plate can be provided with a first sideways extending arm that is irremovably fixed to the cam plate. The inner slit can be arranged to receive a driving pin, and the circumferential wall can be tailored to fit into an aperture provided in an actuating part of a jaw arm of the eviscerating tool.

In exemplary embodiments, the invention can also be embodied in a jaw arm as described as part of an eviscerating tool as described herein and can include an aperture suitable for receiving a cam plate. The jaw arm can be provided with a second sideways extending arm capable of holding a spring mounted on a bolt and nut.

In particular, the jaw arm can include an axis of rotation defined by a pinhole and an aperture in an actuating part of the jaw arm. The aperture can be placed distant from the jaw of the jaw arm at a location in the actuating part that is opposite to the pinhole with reference to the jaw. In an exemplary aspect, the aperture is larger than the pinhole and shaped different than the pinhole, and the aperture and the pinhole are the only through holes of the jaw arm, and wherein distant from the pinhole and distant from the jaw of the jaw arm, the jaw arm is provided with a second sideways extending arm.

The second sideways extending arm may be capable of holding a spring mounted on a bolt and nut.

BRIEF DESCRIPTION OF THE DRAWINGS

The accompanying drawings, which are incorporated into and forms a part of the specification, illustrate one or more exemplary embodiments of the present invention and, together with the description, serves to explain the principles of the invention. The drawings are only for the purpose of illustrating one or more embodiments of the invention and is not to be construed as limiting the invention.

FIG. 1 shows an exemplary eviscerating tool of the invention in a closed position;

FIG. 2 shows the eviscerating tool of FIG. 1 in an open position;

Whenever in the drawings the same reference numerals are applied, these numerals refer to the same parts.

DETAILED DESCRIPTION OF THE INVENTION

Figure 5:
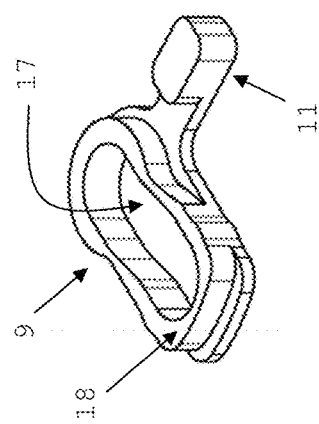
FIG. 5 shows the exemplary cam plate.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Turning now first to FIG. 1 and FIG. 2, such show an exemplary eviscerating tool 1 according to the invention, which includes jaw arms 2, 3 provided with jaws 4, 5 at extremities of the jaw arms 2, 3.

Usually there are several eviscerating tools 1, all forming part of an eviscerating device, the eviscerating device being placeable in a processing line for eviscerating poultry, the processing line including a carousel device for driving the respective eviscerating tools 1. Such a construction is clear for the skilled person and therefore not shown in the drawing.

For this exemplary embodiment, at least one of the jaw arms, to note jaw arm 3, has an axis of rotation 6' as provided by a pin 6 which provides that the eviscerating tool 1 is movable between an open position as depicted in FIG. 2, and a closed position as depicted in FIG. 1. In the open position shown in FIG. 2, the jaws 4, 5 can grip poultry intestines, and in the closed position shown in FIG. 1 the jaws 4, 5 can hold the poultry intestines.

Figure 4:
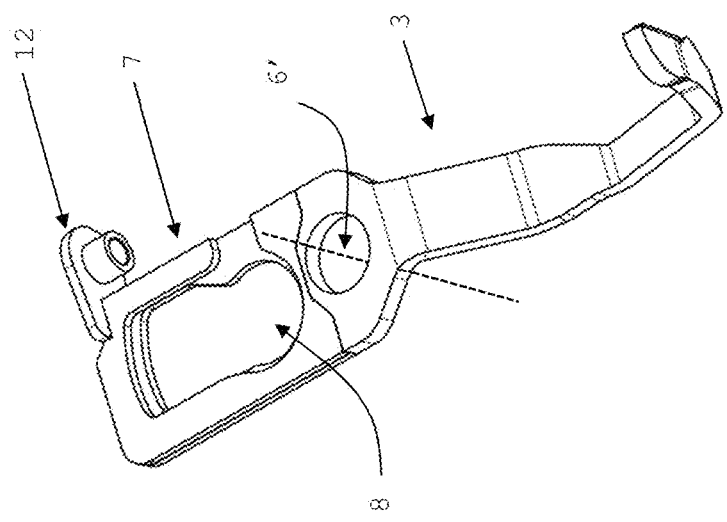
FIG. 4 shows the jaw arms shown in FIG. 3 without the cam plate.
Figure 3:
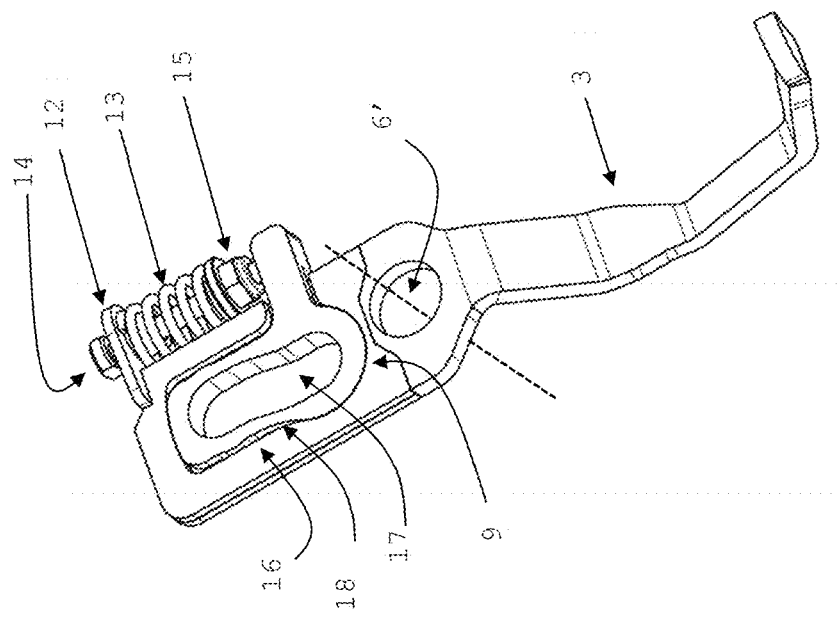
FIG. 3 shows one of the jaw arms of the exemplary eviscerating tool of FIG. 1, that is provided with a cam plate.

At least one jaw arm 3 of the jaw arms 2, 3, in this case only jaw arm 3, is provided with an actuation part 7 for moving the jaws 4, 5 between the open position of the eviscerating tool 1 (FIG. 2) and the closed position of the eviscerating tool 1 (FIG. 1). As is best shown in FIG. 4, the actuation part 7 includes an aperture 8, the aperture 8 being equipped to receive a cam plate 9 which is separately shown in FIG. 5. In FIG. 3, the concerning jaw arm 3 is shown whilst the cam plate 9 is assembled together with the jaw arm 3. It can be noted from the FIGS. that the aperture 8 is placed distant from the jaw 5 of the jaw arm 3 at a location in the actuating part 7 that is opposite to the pinhole 6' in comparison with the jaw 5. The aperture is also larger than the pinhole 6' and shaped different than the pinhole 6'. Furthermore the aperture 8 and the pinhole 6' are the only through holes of the jaw arm 3.

Distant from the pinhole 6' and distant from the jaw 5 of the jaw arm 3, the jaw arm 3 is provided with a second sideways extending arm 12 for this exemplary embodiment.

It is best shown in FIG. 3, although also visible in FIG. 1 and FIG. 2, that the cam plate 9 fits into the aperture 8 with a little play 16 between the cam plate 9 and the aperture 8 enabling a movement of the cam plate 9 with respect to the at least one jaw arm 3. To remove the play on the side where it counts in connection with a reliable operation of the eviscerating tool 1, a load is applied to the cam plate 9 to bias the cam plate 9 into a preferred position in the aperture 8. As will be explained hereinafter the load can suitably be applied with a spring, although other load means are also feasible.

Further with respect to FIG. 1 and FIG. 2, it is shown that the cam plate 9 is drivable by an external drive pin 10 of the eviscerating device of which the eviscerating tool 1 forms a part, the drive pin being arranged to move the concerning jaw arm 3 that is provided with the cam plate 9. The external drive pin 10 is operated in a known way by the motion of a cam wheel that follows a cam wheel track at the circumference of a rotary machine, also known as carousel machine. This construction does not relate to the essence of the invention and is therefore not further shown in the drawing, not to mention that this construction is entirely clear for the skilled person as being a common way for moving the drive pin 10.

Notwithstanding the remark in the previous paragraph, also protective rights are claimed regarding an eviscerating device including multiple eviscerating tools according to the invention, the eviscerating device being placeable in a processing line for eviscerating poultry, and the processing line including a carousel device for driving the respective eviscerating tools according to the invention.

As is shown in FIG. 3 and FIG. 5, the cam plate 9 is provided with a first sideways extending arm 11. FIG. 3 and FIG. 4 show that the concerning jaw arm 3 that is provided with the cam plate 9 is provided with the above-mentioned second sideways extending arm 12. Particularly in FIG. 3, but also in FIG. 1 and FIG. 2, it is shown that the first and second sideways extending arms 11, 12 are loaded with a spring 13. This is one way of arranging that a load is applied to the cam plate 9 to bias the cam plate 9 into a preferred position in the aperture 8, and to limit the influence of wear and tear on the driving motion exerted on the at least one jaw arm 3.

Protective rights are also claimed for the separate cam plate 9, which-as best shown in the exemplary embodiment of FIG. 5-has an inner slit 17 capable to receive a driving pin 10 as depicted in FIG. 1 and FIG. 2. Further, in particular FIG. 3 shows that the cam plate 9 is provided with an outer circumference which fits into an aperture 8 provided in an actuating part 7 of a jaw arm 3 of the eviscerating tool 1. In particular the cam plate 9 includes a single uninterrupted inner slit 17 that is delimited by an outer circumferential wall 18 that on its side facing the inner slit 17 directly delimits the inner single slit 17, wherein on its side facing away from the inner slit 17 the circumferential wall 18 is tailored to fit into the aperture 8 provided in the actuating part 7 of the jaw arm 3 of the eviscerating tool 1.

The first sideways extending arm 11 of the cam plate 9 is irremovably fixed to the cam plate 9.

Correspondingly protective rights are also claimed for the separate jaw arm 3, which includes an aperture 8 suitable for receiving the cam plate 9 according to the previous paragraph, which jaw arm 3 is provided with a second sideways extending arm 12 capable of holding a spring 13 mounted on a bolt 14 and nut 15. In particular the jaw arm 3 includes an axis of rotation 6' in a pinhole 6 and includes an aperture 8 in an actuating part 7 of the jaw arm 3 which is arranged to receive a cam plate 9 for actuating the jaw arm 3. The aperture 8 is placed distant from the jaw 5 of the jaw arm 3 at a location in the actuating part 7 which is opposite to the pinhole 6 in comparison with the jaw 5, and the aperture 8 is larger than and shaped different than the pinhole 6. The aperture 8 and the pinhole 6 are the only through holes of the jaw arm 3. Distant from the pinhole 6 and distant from the jaw 5 of the jaw arm 3, the jaw arm 3 is provided with the second sideways extending arm 12 capable of holding a spring 13 mounted on a bolt 14 and nut 15. In this way the load that the spring 13 may apply to the cam plate 9 is easily adjustable.

Embodiments of the present invention can include every combination of features that are disclosed herein independently from each other. Although the invention has been discussed in the foregoing with reference to an exemplary embodiment of the invention, the invention is not restricted to this particular embodiment which can be varied in many ways without departing from the invention. The discussed exemplary embodiment shall therefore not be used to construe the append-ed claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. An eviscerating tool, comprising
jaw arms provided with jaws at extremities of the jaw arms, wherein at least one jaw arm of the jaw arms is rotatable around an axis of rotation to provide that the eviscerating tool is movable between an open position and a closed position, wherein in the open position the jaws can grip and in the closed position the jaws can hold poultry intestines;
an actuation part provided to at least one jaw arm of the jaw arms and configured for moving the eviscerating tool between the open position and the closed position, the actuation part including an aperture; and
a cam plate received by the aperture, the cam plate drivable for moving the at least one jaw arm of the jaw arms that is provided with the cam plate, wherein the cam plate fits into the aperture while leaving a play between the cam plate and the aperture so as to enable a movement of the cam plate with respect to the at least one jaw arm, wherein the cam plate can be subjected to a load so as to bias the cam plate into a preferred position in the aperture.

2. The eviscerating tool according to claim 1, wherein the cam plate is loaded with a spring.

3. The eviscerating tool according to claim 1, wherein the cam plate further comprises a first sideways extending arm and the at least one jaw arm of the jaw arms that is provided with the cam plate is provided with a second sideways extending arm, and wherein the first and second sideways extending arms are loaded with the spring.

4. The eviscerating tool according to claim 3, wherein the spring is mounted on a bolt and nut that are provided on the second sideways extending arm.

5. An eviscerating device comprising multiple eviscerating tools according to any one of claims 1 through 4, the eviscerating device being placeable in a processing line for eviscerating poultry, the processing line comprising a carousel device for driving the respective eviscerating tools.

6. A cam plate for an evisceration tool according to any one of claims 1 through 4, the cam plate comprising:
a single uninterrupted inner slit that is delimited by an outer circumferential wall that on its side facing the inner slit directly delimits the inner single slit, wherein on its side facing away from the inner slit the circumferential wall is shaped different than according to a circular shape, wherein the cam plate is provided with a first sideways extending arm that is irremovably fixed to the cam plate.

7. The cam plate according to claim 6, wherein the inner slit is arranged to receive a driving pin and the circumferential wall is tailored to fit into an aperture provided in an actuating part of a jaw arm of the eviscerating tool.

8. A jaw arm for an evisceration tool according to any one of claims 1 through 4, the jaw arm comprising:
an axis of rotation in a pinhole and an aperture in an actuating part of the jaw arm, wherein the aperture is placed distant from the jaw of the jaw arm at a location in the actuating part that is opposite to the pinhole with reference to the jaw, wherein the aperture is larger than the pinhole and shaped different than the pinhole, and the aperture and the pinhole are the only through holes of the jaw arm, and wherein distant from the pinhole and distant from the jaw of the jaw arm, the jaw arm is provided with a second sideways extending arm.

9. The jaw arm according to claim 8, wherein the second sideways extending arm is configured for holding a spring mounted on a bolt and nut.

* * * * *